US010367813B2

(12) United States Patent
Anderson et al.

(10) Patent No.: US 10,367,813 B2
(45) Date of Patent: Jul. 30, 2019

(54) DISTRIBUTED AUTHENTICATION WITH THRESHOLDS IN IOT DEVICES

(71) Applicant: McAfee, Inc., Santa Clara, CA (US)

(72) Inventors: Glen J. Anderson, Beaverton, OR (US); John Teddy, Beaverton, OR (US); Chakradhar Kotamraju, Beaverton, OR (US)

(73) Assignee: McAfee, LLC, Santa Clara, CA (US)

( * ) Notice: Subject to any disclaimer, the term of this patent is extended or adjusted under 35 U.S.C. 154(b) by 196 days.

(21) Appl. No.: 15/281,905

(22) Filed: Sep. 30, 2016

(65) Prior Publication Data

US 2018/0097808 A1 Apr. 5, 2018

(51) Int. Cl.
    *H04L 29/06* (2006.01)
(52) U.S. Cl.
    CPC ........ *H04L 63/0884* (2013.01); *H04L 63/062* (2013.01); *H04L 63/20* (2013.01)
(58) Field of Classification Search
    CPC .... H04L 63/062; H04L 63/0884; H04L 63/20
    USPC .......................................... 726/6, 26; 713/6
    See application file for complete search history.

(56) References Cited

U.S. PATENT DOCUMENTS

| 6,253,225 B1* | 6/2001 | Nakahara | G06F 9/4812 718/100 |
| 8,332,919 B2* | 12/2012 | Gomi | H04L 63/08 713/168 |
| 2016/0173495 A1* | 6/2016 | Joo | H04L 63/08 713/171 |
| 2016/0261593 A1* | 9/2016 | Bradley | H04L 63/0853 |
| 2017/0208057 A1* | 7/2017 | Wang | H04L 63/083 |
| 2017/0272415 A1* | 9/2017 | Zhao | H04L 63/061 |
| 2017/0329955 A1* | 11/2017 | Hessler | G06F 21/44 |
| 2018/0084424 A1* | 3/2018 | Sonasath | G06Q 10/02 |
| 2018/0121936 A1* | 5/2018 | Madduri | H04L 67/10 |

OTHER PUBLICATIONS

The International Search Report and The Written Opinion of the International Searching Authority, dated Dec. 12, 2017, 10 pages.

* cited by examiner

*Primary Examiner* — Abu S Sholeman
(74) *Attorney, Agent, or Firm* — Hanley, Flight and Zimmerman, LLC

(57) ABSTRACT

Managing authentication of a child device includes receiving, by a host device, sensor data from a child device, deriving simplified authentication data from the sensor data based on a capability of the child device, storing the simplified authentication data in an authentication profile for the child device, and transmitting the simplified authentication data to the child device, wherein the simplified authentication data is sufficient to allow the child device to authenticate a user without the host device.

26 Claims, 6 Drawing Sheets

US 10,367,813 B2

DISTRIBUTED AUTHENTICATION WITH THRESHOLDS IN IOT DEVICES

TECHNICAL FIELD

Embodiments described herein generally relate to wireless connectivity, and more specifically to distributed authentication with thresholds in IoT devices.

BACKGROUND ART

Today's technology allows users to connect any number of computer devices. Such devices may include, for example, personal computers, laptops, television devices, cell phones, tablets, smart watches, and other devices. In addition, the rise of Internet of Things (IoT) devices allows for the connection of a number of devices not typically considered computing devices, such as medical devices, children's toys, home appliances, wearable devices, and any number of other items that may contain some kind of data activity.

One of the benefits of IoT devices is that they are often low-power devices. Many IoT devices have limited processing power and memory. IoT devices often connect to more powerful host devices, and may rely on host devices for many tasks. Thus, IoT devices may transmit data collected from the sensors to the host device for further processing or to perform analytics. Because of their limited capabilities, many IoT sensing devices minimize communication to the host device in order to conserve power. This may result in limiting the functionality of the IoT device, and may increase latency to respond to conditions determined by the sensor data. Thus, IoT devices could benefit from the ability to perform more complex analysis locally rather than relying on a host device.

DESCRIPTION OF EMBODIMENTS

Figure 1:
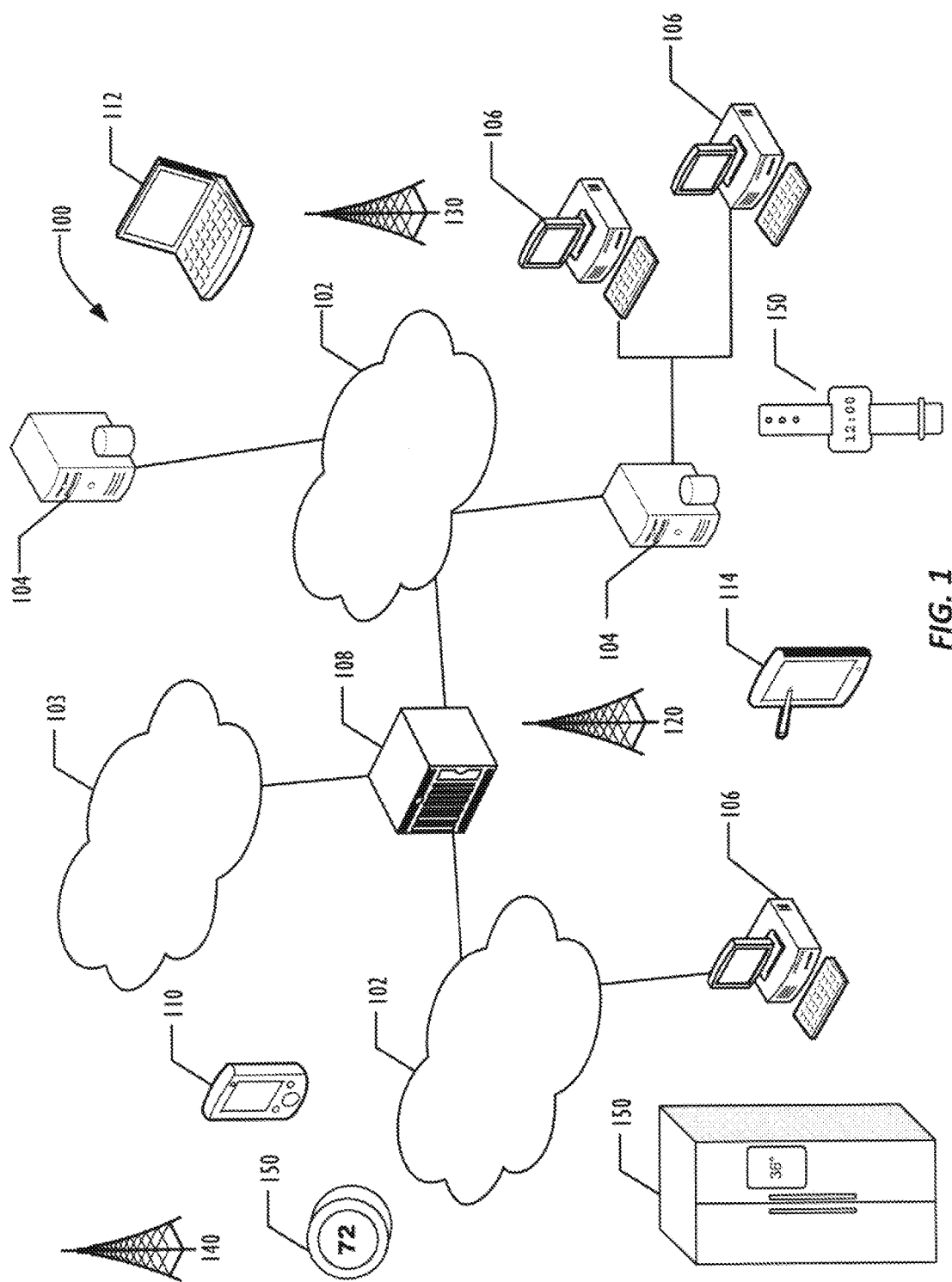
FIG. 1 is a diagram illustrating a network of programmable devices according to one or more embodiments.

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

As used herein, the term "programmable device" can refer to a single programmable device or a plurality of programmable devices working together to perform the function described as being performed on or by the programmable device.

As used herein, the term "medium" refers to a single physical medium or a plurality of media that together store what is described as being stored on the medium.

As used herein, the term "network device" can refer to any programmable device that is capable of communicating with another programmable device across any type of network.

In one or more embodiments, a technique is provided for allowing distributed authentication. Specifically, one or more embodiments allow authentication that would normally require the resources of a host device to be done on a child device, such as an IoT device. According to one or more embodiments, sensor data may be collected by a child device and transmitted to a host device for analysis. In one or more embodiments, the analyzed sensor data and threshold information may be used as authentication data for the child device. The host device may analyze the sensor data to identify threshold sensor data identifying a user's interaction with the child device. The host device may develop an authentication profile for the child device that includes the analysis of the sensor data, and provide simplified authentication data to the child device. According to one or more embodiments, the child device may have the resources to authenticate a user based on the simplified authentication data, but not using the raw data, as the host device would. The child device may authenticate and allow a user to utilize the device while sensor data conforms to the simplified authentication data. Moreover, the child device may disable itself or otherwise prevent a user from using the child device if the sensor data does not conform to the simplified authentication data.

Further, in one or more embodiments, the simplified authentication data may be dynamically modified over time. For example, a child may grow taller, or a person may grow stronger, which may change the range of sensor data collected by the child device. Thus, in one or more embodiments, the simplified authentication data may include buffer values. Further, in one or more embodiments, the child data may occasionally send sensor data back to the host device for purposes of analysis for authentication. Thus, the host device may determine that the simplified authentication data should be updated based on an ongoing trend of sensor values from the child device. As another example, when sensor values begin to trend in a direction toward the threshold value, then the child device may transmit sensor data to the host device for further analysis. Alternatively, or in addition, the host device may update simplified authentication data based on historic sensor data collected, for example, during the normal course of operation of the child device.

Referring to the figures, FIG. 1 an example infrastructure 100 in which embodiments may be implemented is illustrated schematically. Infrastructure 100 contains computer networks 102. Computer networks 102 may include many different types of computer networks available today, such as the Internet, a corporate network, a Local Area Network (LAN), or a personal network, such as those over a Bluetooth® connection. (BLUETOOTH is a registered trademark of Bluetooth Special Interest Group.) Each of these networks can contain wired or wireless programmable devices and operate using any number of network protocols (e.g., TCP/IP). Networks 102 may be connected to gateways and routers (represented by 108), end user computers 106, and computer servers 104. Infrastructure 100 also includes cellular network 103 for use with mobile communication devices. Mobile cellular networks support mobile phones and many other types of mobile devices. Mobile devices in the infrastructure 100 are illustrated as mobile phones 110, laptops 112, and tablets 114. A mobile device such as mobile phone 110 may interact with one or more mobile provider networks as the mobile device moves, typically interacting with a plurality of mobile network towers 120, 130, and 140 for connecting to the cellular network 103. Although referred to as a cellular network in FIG. 1, a mobile device may interact with towers of more than one provider network, as well as with multiple non-cellular devices such as wireless access points and routers 108. In addition, the mobile devices 110, 112, and 114 may interact with non-mobile devices such as computers 104 and 106 for desired services. The functionality of the gateway device 108 may be implemented in any device or combination of devices illustrated in FIG. 1; however, most commonly is implemented in a firewall or intrusion protection system in a gateway or router.

Each of the networks 102 may contain a number of other devices typically referred to as Internet of Things ("IoT") (microcontrollers, embedded systems, industrial control computing modules, etc.). IoT devices 150 may be non-traditional computing devices that have less resources than traditional computing devices. IoT devices 150 typically have a memory and some processing power. Often, IoT devices include sensors that are used to gather data and transmit data to a host device, such as a traditional computing device. The functionality of an IoT device may be specific, and may be used in conjunction with functionality of additional devices to which the IoT device connects. IoT devices may include any number of devices, such as smart watches, thermostats, refrigerators, wearable devices, cameras, medical devices, and any number of other types of devices which include programmable components and network connectivity. IoT devices 150 may include network connectivity that allows the devices to connect to other devices over different types of computer networks available today, such as the Internet, a corporate network, a Local Area Network (LAN), or a personal network, such as those over a Bluetooth connection or other wireless radio connection.

Figure 2:
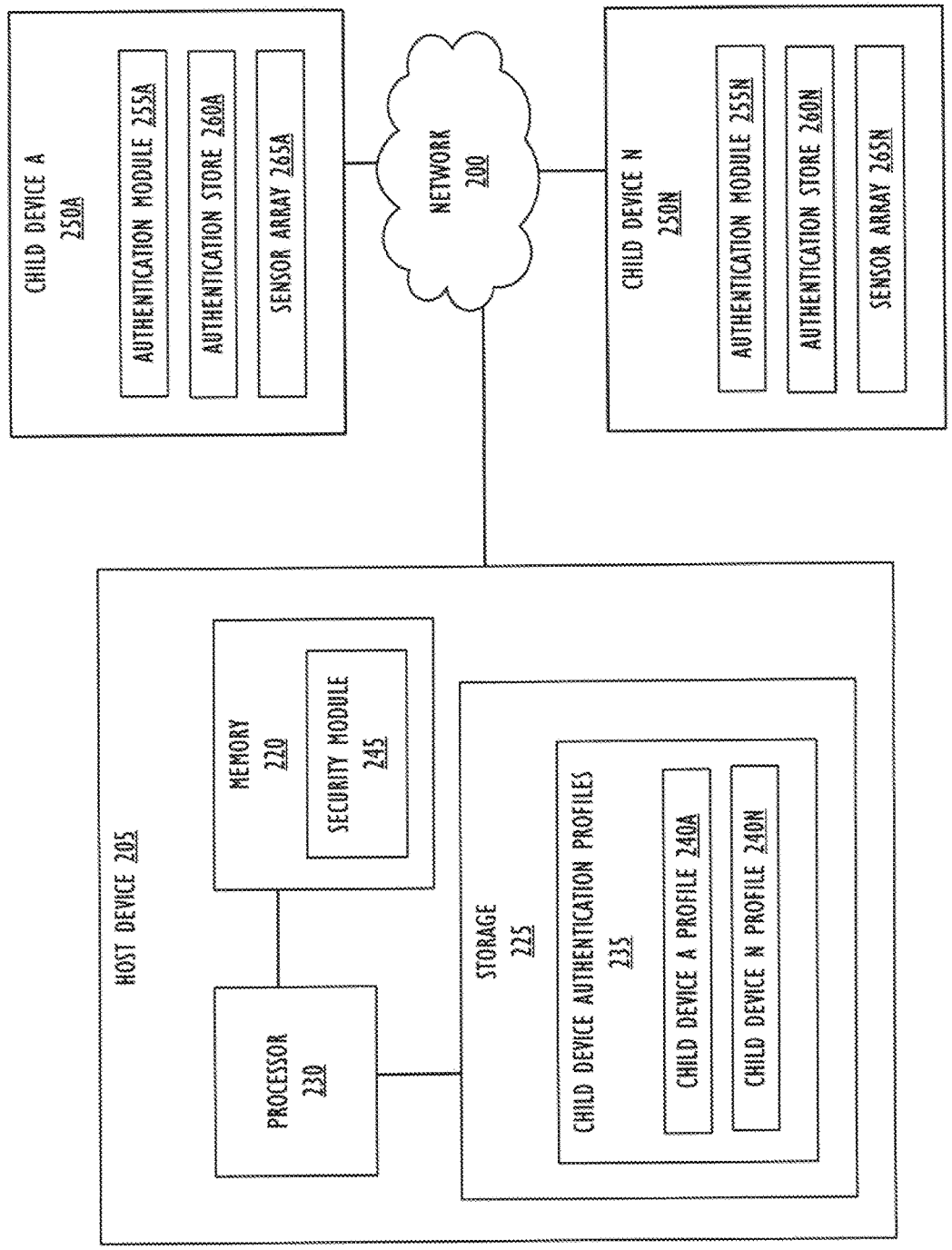
FIG. 2 is a diagram illustrating an example system for distributed authentication according to one or more embodiments.

FIG. 2 is a diagram illustrating an example system for distributed authentication according to one or more embodiments. FIG. 2 includes a host device 205, and two or more additional programmable devices, device A 250A and device N 250N. Host device 205, and child devices 250A-250N may be operatively couple to each other in any combination over network 200. Network 200 may be any type of computer network, such as a LAN or a corporate network, including a plurality of interconnected networks. For example, Network 200 may include a subset of the devices included in larger network 102 or 103.

According to one or more embodiments, host device 205 may be a computer device with numerous components. Host device 205 may include, for example, a memory 220 processor 230, and storage 225 operatively coupled over a bus or other mechanism providing operational connectivity. Processor 230 may include one or more processing devices, such as those described below with respect to FIG. 6. Memory 220 may include one or more different types of memory, which may be used for performing device functions in conjunction with Processor 230. For example, memory 220 may include memory cache, read-only memory (ROM), and/or random access memory (RAM). Memory 220 may store various programming modules, such as computer readable code or instructions, during execution by processor 230. As an example, Memory 220 may include security module 245. In one or more embodiments, security module 245 may provide authentication services for the various child devices 250A-250N. That is, host device 205 may enable or disable the various child devices based on authentication information. In one or more embodiments, security module 245 may obtain sensor data from child devices 250A-N and develop a security profile for the various child devices 250A-250N based on recorded sensor data from the devices.

In one or more embodiments, the authentication profiles for the various child devices 250A-250N are stored in storage 225. According to one or more embodiments, Storage 225 may include one more non-transitory storage mediums including, for example, magnetic disks (fixed, floppy, and removable), optical media such as CD-ROMs and digital video disks (DVDs), and semiconductor memory devices such as Electrically Programmable Read-Only Memory (EPROM), and Electrically Erasable Programmable Read-Only Memory (EEPROM). Storage 225 may include child device authentication profiles 235, stored in any kind of data structure. Child device authentication profiles 235 may include authentication profiles for one or more of child devices 250A-250N, as shown by child device A profile 240A and child device N profile 240N. In one or more embodiments, the various authentication profiles may indicate sensor data and other authentication data that renders the corresponding child device authenticated. According to one or more embodiments, the child device profiles 240A and 240N may include simplified authentication data, which, when utilized by the corresponding child device, allows the child device to authenticate a user without consulting the host device 205. As an example, the child device profiles 240A and 240N may include threshold values for sensor data within which a user is determined to be authenticated. Further, the child device profiles 240A and 240N may include other data related to the analysis of the sensor data and/or the determination of the corresponding authentication profile. According to one or more embodiments, the various profiles may be built in any number of ways. For example, machine learning algorithms may be utilized to learn faces or motion gestures. Facial recognition and speaker recognition could also be utilized.

In one or more embodiments, child devices 250A-250N may be electronic devices with numerous components, such as processor, memory, and storage. Further, in one or more embodiments, the child devices 250A-250N, as depicted, may be a more constricted device, and have only bare bones components, such as a processor and memory. Specifically, according to one or more embodiments, the child devices 250A-250N may be more restricted in processing power, storage, or other resources, as compared to host device 205. According to one or more embodiments, child devices 250A-250N may include instructions or computer code executable by a processor. Those instructions may include authentication module 225A and 225N. According to one or more embodiments, authentication module 225A and 225N may manage authentication of the corresponding child device based on sensor data.

The child devices 250A-250N, may also include other components, such as a sensor array 265A and 265N. Sensor arrays 265A and 265N may include one or more sensors. According to one or more embodiments, sensor arrays 265A and 265N may include any kind of sensor utilized to gather data, including data regarding an interaction of a user with the child device. For example, sensor arrays 265A and 265N may include accelerometers, thermometers, gyrometers, cameras or other light sensors, pressure sensors, altimeters, heart rate monitors, oximetry sensors, skin conductance sensors, geolocation, and the like.

According to one or more embodiments, the authentication module 225A-225N may monitor sensor data to determine whether the sensor data satisfies simplified authentication data, which may be provided by the host device 205, as described above. In one or more embodiments, the simplified authentication data may be stored in authentication store 260A-260N. According to one or more embodiments, the simplified authentication data provides a simplified profile of a user's expected interactions with the child device such that the child device may authenticate the user without further analysis of sensor data by the host device 205. According to one or more embodiments, the simplified authentication data may identify threshold sensor data values within which a user is authenticated.

Figure 3:
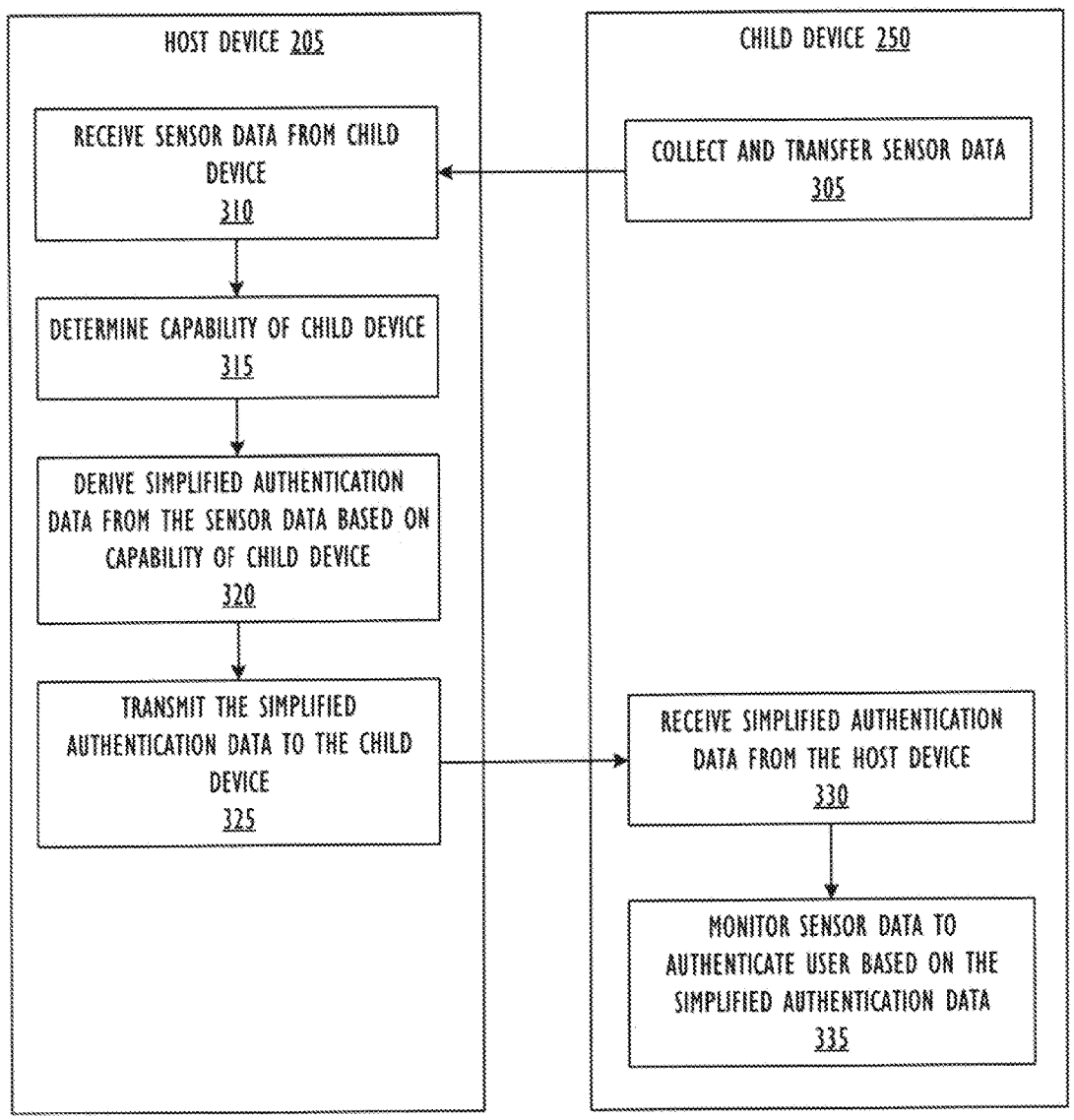
FIG. 3 is a flow diagram illustrating distributed authentication according to one or more embodiments.

FIG. 3 is a flow diagram illustrating distributed authentication according to one or more embodiments. Specifically, FIG. 3 depicts a method to setup an authentication profile and simplified authentication data, according to one or more embodiments. Although the various steps in FIG. 3 are shown in a particular order, in one or more embodiments, the various activity depicted may be in another order. Further, various actions may be removed, or additional actions may be added. Moreover, in one or more embodiments, two or more of the actions depicted by occur in parallel. For purposes of clarity, the various actions will be discussed by referring back to various components as described in FIG. 2. However, in one or more embodiments, the various actions may be taken by alternative components, or components not discussed in FIG. 2. In addition, for purposes of clarity, the various processes are explained with respect to host device 205 and a generic child device 250.

The flowchart begins at 305, and sensor data is collected at the child device 250 and transferred to the host device 205. According to one or more embodiments, the sensor data is collected from one or more sensors, and may indicate an interaction of a particular user with the child device 250. As an example, skin tone may be detected, or other factors such as a person's gait, or idiosyncratic movements. In one or more embodiments, the sensor data may be collected organically, for example through the normal use of the child device 250 by a user. Said another way, according to one or more embodiments, the sensor data may be collected without a directive from a user. As another example, the sensor data may be collected in response to a directive from the child device 250 or the host device 205 for a user to set authentication data. For example, a user may utilize a particular gesture or other data captured by a sensor as a kind of authentication data. As another example, a child's toy may be a child device 250 that streams data to the host device 205 to identify motion gestures, such as a toy car crashing and emitting a sound effect.

The flowchart continues at 310, and the host device receives the sensor data from the child device. In one or more embodiments, host device 205 may receive sensor data after prompting a user to interact with the child device 250 in some way as to collect authentication information. Alternatively, or additionally, the host device 205 may occasionally or periodically receive sensor data.

At 315, the host device 205 determines a capability of the child device 250. In one or more embodiments, child device 250 may have limited resources. According to one or more embodiments, the child device may have less resources than the host device such that the host device 205 may authenticate a user based on sensor data, but the child device 250 cannot. Thus, at 315, the host device may determine what resources are available to the child device 250. In one or more embodiments, the host device 205 may prompt the child device for data regarding available resources. The host device 205 may alternatively obtain information regarding child device 250 resources from a remote source, such as a remote server, or may utilize a predetermined level of resources.

The flowchart continues at 320, where the host device 205 derives simplified authentication data from the sensor data collected from the child device 250, based on the determined capability of the child device 250. Further, in one or more embodiments, the simplified authentication data may be derived in a manner determined based on the technical capabilities of the child device 250. As an example, fast Fourier transforms on the host device 205 may allow sensor data to be analyzed for particular thresholds. For example, a user's voice to be analyzed for a frequency distribution of tones. Based on the analysis, the host device 205 could define a range of tones that account for some percentage, such as 80%, of user's tones. In one or more embodiments, the tones could be recognized for a particular phrase. The host device 205 may identify threshold values, such as 80% of a user's subsequence utterance matches as simplified authentication data. In one or more embodiments, the host device 205 may determine additional simplified authentication data, such as a buffer for the threshold value. Thus, an additional 5% may be added on either side, such as a threshold value of 75%-85% of tone of utterance. The simplified authentication data may also indicate that the threshold value applies to a specific phrase, or to any future data. That is, the authentication data may be specific to a particular action taken by a user, or may be related to some or all of future interactions of a user with the child device 250. Further, the simplified authentication data may consider sensor data from multiple kinds of sensors. The data from various sensors may be weighted based on how good of a match it is considered. For example, the simplified authentication data may consider location and sound, whereas sound is considered more important than location in determining authentication.

As another example, the host device 205 may perform a skin texture analysis to detect various details of the user's skin, such as lines, patterns, and spots apparent on the user's skin. The identification of certain details in the skin may be used as authentication data. Further, as another example, the host device 205 may identify a smaller portion of the sensor data captured by the sensors, and provide the smaller portion for pattern matching. At 325, the host device 205 transmits the simplified authentication data to the child device. In one or more embodiments, the host device 205 may store the simplified authentication data along with other data regarding the authentication data for the child device 150 as an authentication profile in child device authentication profiles 235. Returning to the example of the toy car, after a number of crash events, the host device 205 may assign accelerometer thresholds that can be identified by the child device 250. Other threshold data may include such data as periodic proximity to the host device 205, ambient sound, motion sensing, and other factors. Other examples of sensor data that may be utilized include pressure, for example in sporting equipment, images, for feature detection and skin color, and the like.

The flowchart continues at 330, and the child device 250 receives the simplified authentication data from the host device 205. In one or more embodiments, the simplified authentication may be stored in a local storage, such as authentication store 260. In one or more embodiments, the simplified authentication data may only include some of the data in the authentication profile on the host device 205. At 335, the child device 250 monitors the sensor data to authenticate the user based on the simplified authentication data. According to one or more embodiments, the child device 250 may monitor sensor data collected through the natural interaction of a user with the child device 250, or may be monitored when a user is prompted to enter a passcode-type interaction, either by the child device 250 or a host device 205, such as a particular gesture or other interaction the user has selected as authentication information.

Figure 4:
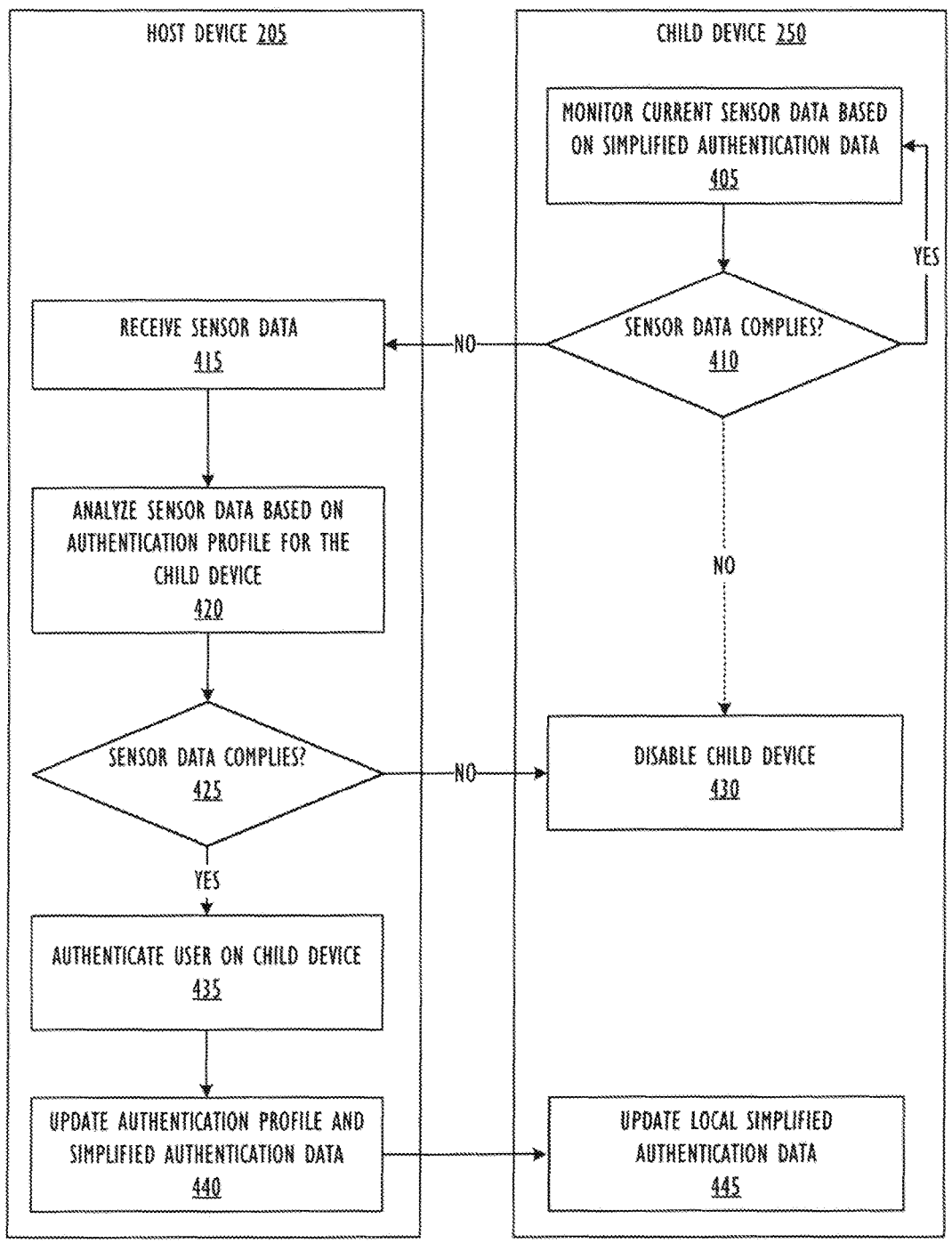
FIG. 4 is a flow diagram illustrating a technique for updating distributed authentication data, according to one or more embodiments.

FIG. 4 is a flow diagram illustrating a technique for updating distributed authentication data, according to one or more embodiments. Specifically, FIG. 4 depicts a method for utilizing and updating an authentication profile and simplified authentication data, according to one or more embodiments. Although the various steps in FIG. 4 are shown in a particular order, in one or more embodiments, the various activity depicted may be in another order. Further, various actions may be removed, or additional actions may be added. Moreover, in one or more embodiments, two or more of the actions depicted by occur in parallel. For purposes of clarity, the various actions will be discussed by referring back to various components as described in FIG. 2. However, in one or more embodiments, the various actions may be taken by alternative components, or components not discussed in FIG. 2.

The flowchart begins at 405, where the child device 250 monitors current sensor data based on the simplified authentication data. According to one or more embodiments, the sensor data is collected from one or more sensors of a sensor array, and may indicate an interaction of a particular user with the child device 250. As an example, images, movement, sounds, and the like, may be collected by one or more sensors. In one or more embodiments, the sensor data may be collected organically, for example through the normal use of the child device 250 by a user. As another example, the sensor data may be collected in response to a directive from the child device 250 or the host device 205 for a user to provide authentication data. For example, a user may utilize a particular gesture or other data captured by a sensor previously saved as authentication data.

The flowchart continues at 410, and a determination is made regarding whether the sensor data complies with the simplified authentication data. As described above, the simplified authentication data may provide data utilized to perform a match, or may identify characteristics of sensor data. The simplified authentication data may have previously been generated and transmitted from the host device 205 and stored in an authentication store in the local child device 250. If at 410, it is determined that the sensor data complies with the simplified authentication data, then the flowchart continues at 405, and the child device 250 continues to monitor the current sensor data.

Returning to block 410, if it is determined that the current sensor data does not comply with the simplified authentication data, then, in one or more embodiments, the flowchart may continue directly to 430, and the child device 250 may disable the child device. Thus, according to one or more embodiments, the child device 250 may utilize the current sensor data with the simplified authentication data to authenticate a user without consulting the host device 205 for further analysis of the sensor data. Likewise, according to one or more embodiments, the child device 250 may disable itself without consulting the host device 205 for further analysis of the sensor data. In one or more embodiments, disabling the child device 250 may include one or more of blocking certain functionality of the device, isolating data collected by the child device 250, terminating a secured session of a user on the child device 250, notifying the host device 405 or other third party device of the offending activity, and submitting the sensor data for offsite analysis. Although not shown, disabling the child device 250 may additionally, or alternatively, cause a user to be notified, either by the child device 250, a host device 205, or another device associated with the user, that the user must reauthenticate itself.

According to one or more embodiments, returning to block 410, if it is determined that the current sensor data does not comply with the simplified authentication data, then the flowchart continues at 415. At 415, the host device 205 receives the sensor data from the child device 250. According to one or more embodiments, the sensor data 415 may be transmitted by the child device 250 in response to a determination that the sensor data does not comply with the simplified authentication data. According to one or more embodiments, the host device 205 may collect additional historic sensor data, such as sensor data previously collected by child device 250 during authentication, or sensor data received by host device 205 during the natural course of a user interacting with the child device 250.

The flowchart continues at 420 and the flowchart analyzes the sensor data based on the authentication profile for the child device. According to one or more embodiments, the host device 205 may perform a second check on the sensor data against the simplified authentication data, which may be stored in the child device authentication profile. According to one or more embodiments, the host device 205 may additionally, or alternatively, utilize further data to analyze the sensor data. For example, the host device 205 may utilize the additional historic sensor data collected from child device 250, or collected with respect to the user from other child devices, or even from sensors associated with the host device. Further, in one or more embodiments, host device 205 may perform a more complex analysis than would be available on the child device 250. As an example, the host device 205 may perform an analysis based on the additional authentication data stored in the authentication profile for the user device, or use more complex, but more accurate, calculations to determine whether the sensor data complies with an authentication profile.

The flowchart continues at 425 and a determination is made regarding whether the sensor data complies with an authentication profile for the child device. According to one or more embodiments, the host device 205 may determine whether the current sensor data complies with the more elaborate or complex analysis as described above. If, at block 425, is determined that the sensor data does not comply with the authentication profile for the child device, then the flowchart continues at 430, and the child device is disabled. In one or more embodiments, disabling the child device 250 may include one or more of blocking certain functionality of the device, isolating data collected by the child device 250, terminating a secured session of a user on the child device 250, notifying the host device 405 or other third party device of the offending activity, and submitting the sensor data for offsite analysis. Although not shown, disabling the child device 250 may additionally, or alternatively, cause a user to be notified, either by the child device 250, a host device 205, or another device associated with the user, that the user must reauthenticate itself.

Returning to block 425, if it is determined that the sensor data does comply with the authentication profile for the child device, then the flowchart continues at 435. At 435, the host device 205 authenticates the user on the child device. According to one or more embodiments, the simplified authentication data may not have been sufficient to properly detect a match or other compliance with the authentication data. The flow chart continue at 440, and the host device 205 updates an authentication profile on the host device 205 and determines updated simplified authentication data. Then, at 445, the child device 250 receives the updated local simplified authentication data.

Although not shown, once the child device 250 is disabled, the user may be prompted to re-authenticate the child device 250. Re-authenticating the user on the child device may include requesting, from the user, updated authentication data. For example, the user may be prompted to re-submit the authentication interaction originally used. As an example, a user's voice may have dropped, or the user may have a tan, which may require the user update the characteristics of the sensor data utilized for authentication.

Also not shown, over time, either the child device 250 or the host device 205 may obtain sensor data, either through the natural use of the child device 250, or other device, which indicates a trend in a change of authentication data. As an example, if the simplified authentication data includes a buffer, and the data begins consistently falling in the buffer range on one end, then a trend in the change of the authentication data may be identified. Returning to the example of a user's voice dropping or a face tanning, a trend may be detected over time. In response, the host device 205 may proactively modify the simplified authentication data and transmit the updated simplified authentication data to the child device 250.

Figure 5:
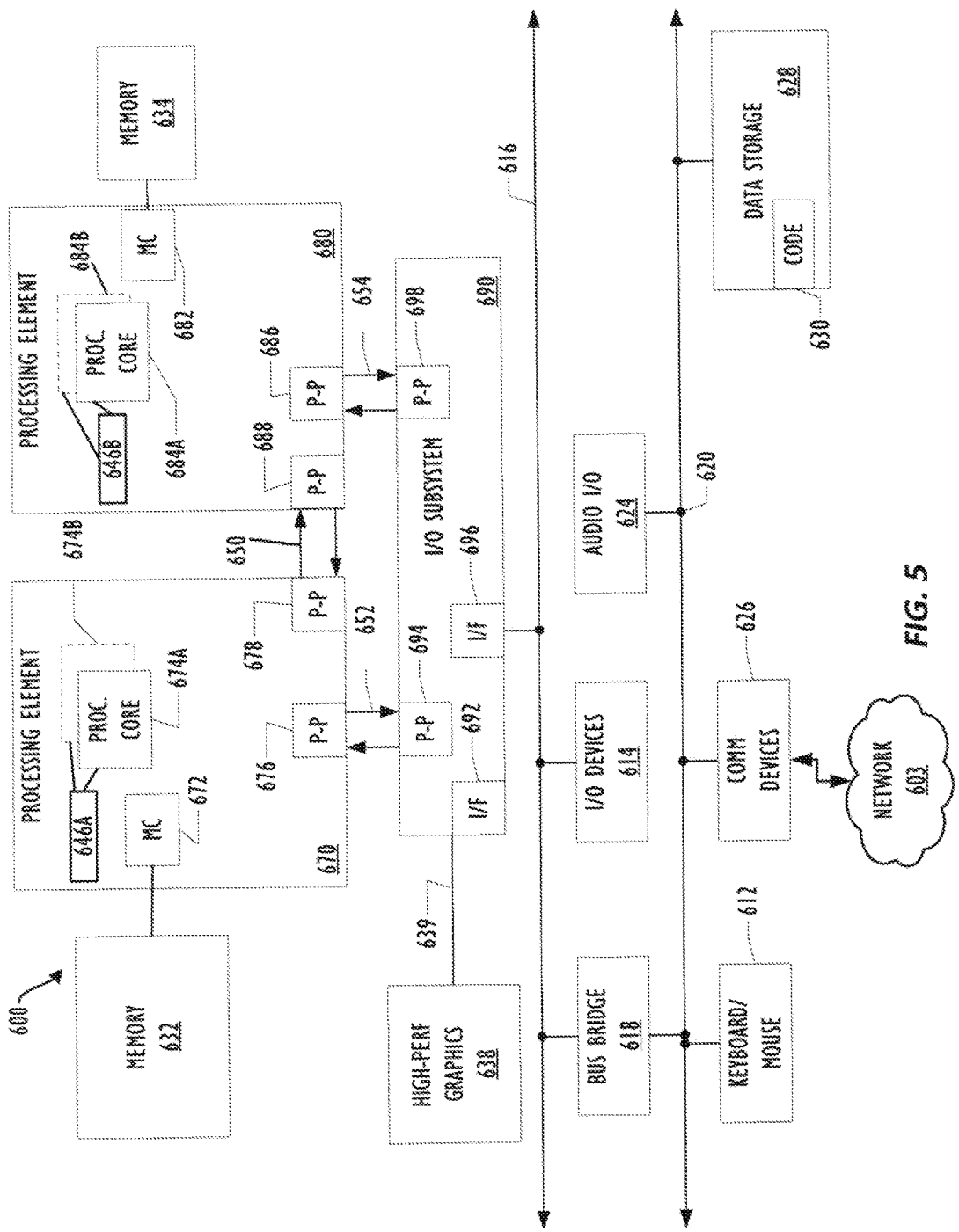
FIG. 5 is a diagram illustrating a computing device for use with techniques described herein according to one embodiment.

Referring now to FIG. 5, a block diagram illustrates a programmable device 600 that may be used within an IoT device, such as device 205, or device 210, in accordance with one or more embodiments. Devices 205 and 210 may not include all of the elements of FIG. 5. The programmable device 600 illustrated in FIG. 5 is a multiprocessor programmable device that includes a first processing element 670 and a second processing element 680. While two processing elements 670 and 680 are shown, an embodiment of programmable device 600 may also include only one such processing element.

Programmable device 600 is illustrated as a point-to-point interconnect system, in which the first processing element 670 and second processing element 680 are coupled via a point-to-point interconnect 650. Any or all of the interconnects illustrated in FIG. 5 may be implemented as a multidrop bus rather than point-to-point interconnects.

As illustrated in FIG. 5, each of processing elements 670 and 680 may be multicore processors, including first and second processor cores (i.e., processor cores 674a and 674b and processor cores 684a and 684b). Such cores 674a, 674b, 684a, 684b may be configured to execute instruction code in a manner similar to that discussed above in connection with FIGS. 1-4. However, other embodiments may use processing elements that are single core processors as desired. In embodiments with multiple processing elements 670, 680, each processing element may be implemented with different numbers of cores as desired.

Each processing element 670, 680 may include at least one shared cache 646. The shared cache 646a, 646b may store data (e.g., instructions) that are utilized by one or more components of the processing element, such as the cores 674a, 674b and 684a, 684b, respectively. For example, the shared cache may locally cache data stored in a memory 632, 634 for faster access by components of the processing elements 670, 680. In one or more embodiments, the shared cache 646a, 646b may include one or more mid-level caches, such as level 2 (L2), level 3 (L3), level 4 (L4), or other levels of cache, a last level cache (LLC), or combinations thereof.

While FIG. 5 illustrates a programmable device with two processing elements 670, 680 for clarity of the drawing, the scope of the present invention is not so limited and any number of processing elements may be present. Alternatively, one or more of processing elements 670, 680 may be an element other than a processor, such as an graphics processing unit (GPU), a digital signal processing (DSP) unit, a field programmable gate array, or any other programmable processing element. Processing element 680 may be heterogeneous or asymmetric to processing element 670. There may be a variety of differences between processing elements 670, 680 in terms of a spectrum of metrics of merit including architectural, microarchitectural, thermal, power consumption characteristics, and the like. These differences may effectively manifest themselves as asymmetry and heterogeneity amongst processing elements 670, 680. In some embodiments, the various processing elements 670, 680 may reside in the same die package.

Figure 6:
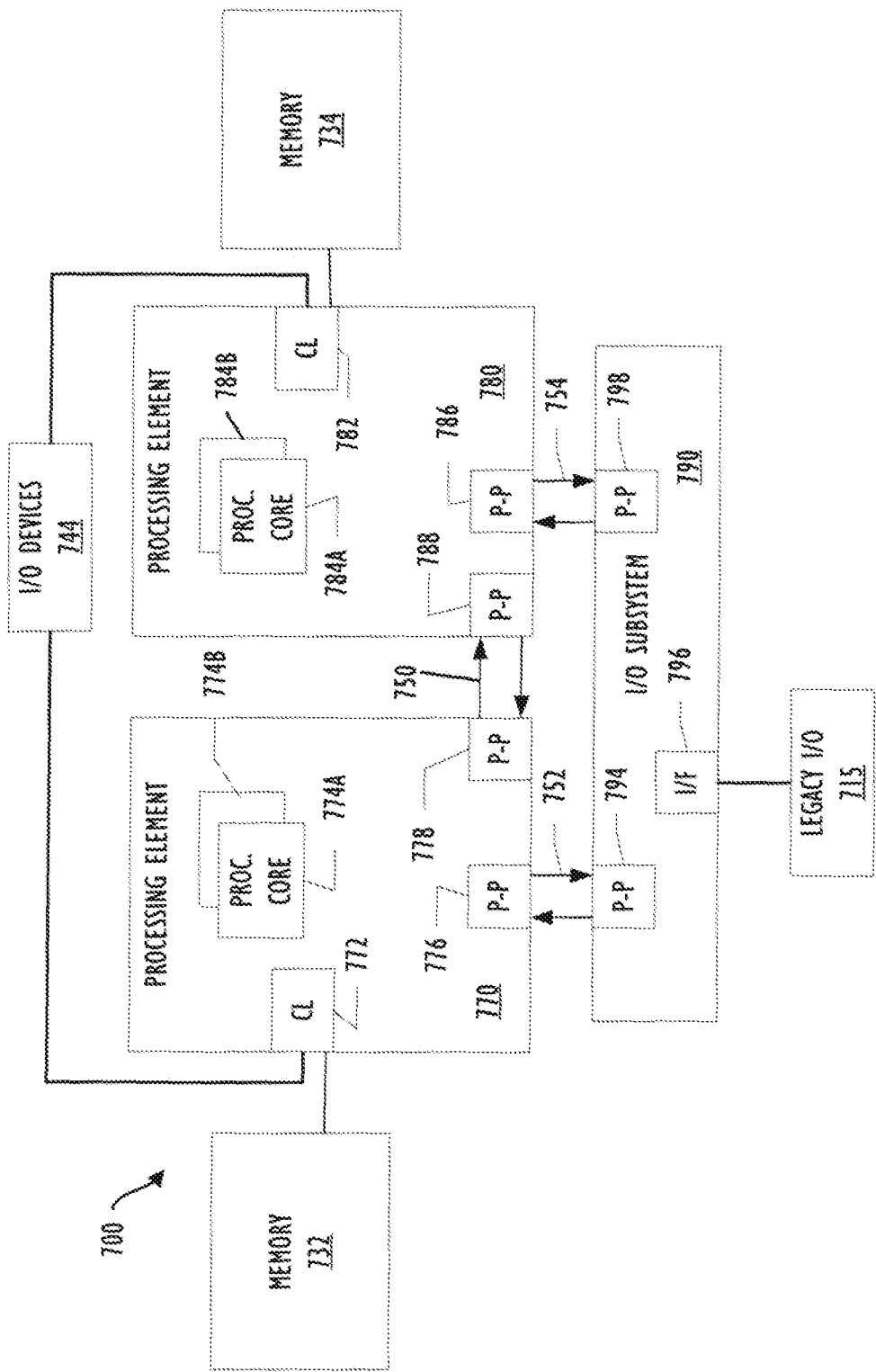
FIG. 6 is a block diagram illustrating a computing device for use with techniques described herein according to another embodiment.

First processing element 670 may further include memory controller logic (MC) 672 and point-to-point (P-P) interconnects 676 and 678. Similarly, second processing element 680 may include a MC 682 and P-P interconnects 686 and 688. As illustrated in FIG. 6, MCs 672 and 682 couple processing elements 670, 680 to respective memories, namely a memory 632 and a memory 634, which may be portions of main memory locally attached to the respective processors. While MC logic 672 and 682 is illustrated as integrated into processing elements 670, 680, in some embodiments the memory controller logic may be discrete logic outside processing elements 670, 680 rather than integrated therein.

Processing element 670 and processing element 680 may be coupled to an I/O subsystem 690 via respective P-P interconnects 676 and 686 through links 652 and 654. As illustrated in FIG. 6, I/O subsystem 690 includes P-P interconnects 694 and 698. Furthermore, I/O subsystem 690 includes an interface 692 to couple I/O subsystem 690 with a high performance graphics engine 638. In one embodiment, a bus (not shown) may be used to couple graphics engine 638 to I/O subsystem 690. Alternately, a point-to-point interconnect 639 may couple these components.

In turn, I/O subsystem 690 may be coupled to a first link 616 via an interface 696. In one embodiment, first link 616 may be a Peripheral Component Interconnect (PCI) bus, or a bus such as a PCI Express bus or another I/O interconnect bus, although the scope of the present invention is not so limited.

As illustrated in FIG. 5, various I/O devices 614, 624 may be coupled to first link 616, along with a bridge 618 which may couple first link 616 to a second link 620. In one embodiment, second link 620 may be a low pin count (LPC) bus. Various devices may be coupled to second link 620 including, for example, a keyboard/mouse 612, communication device(s) 626 (which may in turn be in communication with the computer network 603), and a data storage unit 628 such as a disk drive or other mass storage device which may include code 630, in one embodiment. The code 630 may include instructions for performing embodiments of one or more of the techniques described above. Further, an audio I/O 624 may be coupled to second bus 620.

Note that other embodiments are contemplated. For example, instead of the point-to-point architecture of FIG. 5, a system may implement a multi-drop bus or another such communication topology. Although links 616 and 620 are illustrated as busses in FIG. 5, any desired type of link may be used. Also, the elements of FIG. 5 may alternatively be partitioned using more or fewer integrated chips than illustrated in FIG. 5.

Referring now to FIG. 6, a block diagram illustrates a programmable device 700 according to another embodiment. Certain aspects of FIG. 5 have been omitted from FIG. 6 in order to avoid obscuring other aspects of FIG. 6.

FIG. 6 illustrates that processing elements 770, 780 may include integrated memory and I/O control logic ("CL") 772 and 782, respectively. In some embodiments, the 772, 782 may include memory control logic (MC) such as that described above in connection with FIG. 5. In addition, CL 772, 782 may also include I/O control logic. FIG. 6 illustrates that not only may the memories 732, 734 be coupled to the 772, 782, but also that I/O devices 744 may also be coupled to the control logic 772, 782. Legacy I/O devices 715 may be coupled to the I/O subsystem 790 by interface 796. Each processing element 770, 780 may include multiple processor cores, illustrated in FIG. 6 as processor cores 774A, 774B, 784A, and 784B. As illustrated in FIG. 6, I/O subsystem 790 includes P-P interconnects 794 and 798 that connect to P-P interconnects 776 and 786 of the processing elements 770 and 780 with links 752 and 754. Processing elements 770 and 780 may also be interconnected by link 750 and interconnects 778 and 788, respectively.

The programmable devices depicted in FIGS. 5 and 6 are schematic illustrations of embodiments of programmable devices which may be utilized to implement various embodiments discussed herein. Various components of the programmable devices depicted in FIGS. 6 and 7 may be combined in a system-on-a-chip (SoC) architecture.

It is to be understood that the various components of the flow diagrams described above, could occur in a different order or even concurrently. It should also be understood that various embodiments of the inventions may include all or just some of the components described above. Thus, the flow diagrams are provided for better understanding of the embodiments, but the specific ordering of the components of the flow diagrams are not intended to be limiting unless otherwise described so.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as a computer program product that may include a machine readable medium having stored thereon instructions that may be used to program a processing system or other electronic device to perform the methods. The term "machine readable medium" used herein shall include any medium that is capable of storing or encoding a sequence of instructions for execution by the machine and that cause the machine to perform any one of the methods described herein. The term "machine readable medium" shall accordingly include, but not be limited to, tangible, non-transitory memories such as solid-state memories, optical and magnetic disks. Furthermore, it is common in the art to speak of software, in one form or another (e.g., program, procedure, process, application, module, logic, and so on) as taking an action or causing a result. Such expressions are merely a shorthand way of stating that the execution of the software by a processing system causes the processor to perform an action or produce a result.

The following examples pertain to further embodiments.

Example 1 includes a computer readable medium for managing authentication of a child device, the computer readable medium comprising computer code executable by one or more processors to: receive, by a host device, sensor data from a child device; derive simplified authentication data from the sensor data based on a capability of the child device; store the simplified authentication data in an authentication profile for the child device; and transmit the simplified authentication data to the child device, wherein the simplified authentication data is sufficient to allow the child device to authenticate a user without the host device.

Example 2 includes the computer readable medium of Example 1, wherein the computer code to derive the simplified authentication data comprises computer code to determine threshold values corresponding to the sensor data.

Example 3 includes the computer readable medium of Example 2, wherein the computer code to derive simplified authentication data comprises computer code to: obtain technical abilities of the child device, and determine the threshold values for the sensor data based on the technical abilities of the child device.

Example 4 includes the computer readable medium of Example 2, further comprising computer code to: receive historic sensor data from the child device; determine that the threshold values should be modified based on the historic sensor data; modify the simplified authentication data based on the historic sensor data; and transmit the modified simplified authentication data to the child device.

Example 5 includes the computer readable medium of any of Examples 1-2, wherein the sensor data is obtained from a plurality of sensors of the child device, and wherein the simplified authentication data comprises weighted values for sensor data from each of the plurality of sensors.

Example 6 includes the computer readable medium of any of Examples 1-2, further comprising computer readable code to: receive an indication from the child device that additional sensor data does not conform to the simplified authentication data; and disable the child device.

Example 7 includes the computer readable medium of Example 6, wherein disabling the child device comprises: performing an analysis of the additional sensor data to determine whether the additional sensor data conforms to the authentication profile for the child device, and disabling the child device in response to determining that the additional sensor data does not conform to the authentication profile for the child device.

Example 8 includes a system for managing authentication of a child device, the system comprising: one or more processors; and a memory coupled to the one or more processors and comprising instructions which, when executed by the one or more processors, cause the system to: receive, by a host device, sensor data from a child device; derive simplified authentication data from the sensor data based on a capability of the child device; store the simplified authentication data in an authentication profile for the child device; and transmit the simplified authentication data to the child device, wherein the simplified authentication data is sufficient to allow the child device to authenticate a user without the host device.

Example 9 includes the system of Example 8, wherein the instructions to derive the simplified authentication data comprises instructions to determine threshold values corresponding to the sensor data.

Example 10 includes the system of Example 9, wherein the instructions to derive simplified authentication data comprises instructions to: obtain technical abilities of the child device, determine the threshold values for the sensor data based on the technical abilities of the child device.

Example 11 includes the system of Example 9, further comprising instructions to: receive historic sensor data from the child device; determine that the threshold values should be modified based on the historic sensor data; modify the simplified authentication data based on the historic sensor data; and transmit the modified simplified authentication data to the child device.

Example 12 includes the system of any of Examples 8-9, wherein the sensor data is obtained from a plurality of sensors of the child device, and wherein the simplified authentication data comprises weighted values for sensor data from each of the plurality of sensors.

Example 13 includes the system of any of Examples 8-9, further comprising instructions to: receive an indication from the child device that additional sensor data does not conform to the simplified authentication data; and disable the child device.

Example 14 includes a method for managing authentication of a child device, comprising: receiving, by a host device, sensor data from a child device; deriving simplified authentication data from the sensor data based on a capability of the child device; storing the simplified authentication data in an authentication profile for the child device; and transmitting the simplified authentication data to the child device, wherein the simplified authentication data is sufficient to allow the child device to authenticate the user without the parent device.

Example 15 includes the method of Example 14, wherein deriving the simplified authentication data comprises determining threshold values corresponding to the sensor data.

Example 16 includes the method of Example 15, wherein deriving simplified authentication data comprises: obtaining technical abilities of the child device, and determining the threshold values for the sensor data based on the technical abilities of the child device.

Example 17 includes the method of any of Examples 14-15, further comprising: receiving historic sensor data from the child device; determining that the threshold values should be modified based on the historic sensor data; modifying the simplified authentication data based on the historic sensor data; and transmitting the modified simplified authentication data to the child device.

Example 18 includes the method of any of Examples 14-15, wherein the sensor data is obtained from a plurality of sensors of the child device, and wherein the simplified authentication data comprises weighted values for sensor data from each of the plurality of sensors.

Example 19 includes the method of any of Examples 14-15, further comprising receiving an indication from the child device that additional sensor data does not conform to the simplified authentication data; performing an analysis of the additional sensor data to determine whether the additional sensor data conforms to the authentication profile for the child device, and disabling the child device in response to determining that the additional sensor data does not conform to the authentication profile for the child device.

Example 20 includes a computer readable medium for managing authentication of a child device, the computer readable medium comprising computer readable code executable by one or more processors to: obtain, by a local device, sensor data from one or more sensors; transmit the sensor data to a host device for authentication analysis; receive, from the host device, simplified authentication data based on the sensor data; and authenticate the local device based on the simplified authentication data.

Example 21 includes the computer readable medium of Example 20, further comprising: determining that current sensor data does not conform to the simplified authentication data; and in response to determining that the current sensor data does not conform to the simplified authentication data, disabling the local device.

Example 22 includes the computer readable medium of any of Examples 20-21, further comprising computer readable code to: transmit the current sensor data to the host device for further analysis; and authenticate the user based on the further analysis.

Example 23 includes the computer readable medium of any of Examples 20-21, wherein the simplified authentication data comprises threshold values corresponding to the sensor data.

Example 24 includes the computer readable medium of any of Examples 20-21, wherein the simplified authentication data comprises weighted values for sensor data from each of the plurality of sensors.

Example 25 includes the computer readable medium of any of Examples 20-21, further comprising computer code to: transmit additional sensor data to the host device for further analysis, and receive updated simplified authentication data based on the additional sensor data.

Example 26 includes a system for managing authentication of a child device, the system comprising: means for receiving, by a host device, sensor data from a child device; means for deriving simplified authentication data from the sensor data based on a capability of the child device; means for storing the simplified authentication data in an authentication profile for the child device; and means for transmitting the simplified authentication data to the child device, wherein the simplified authentication data is sufficient to allow the child device to authenticate a user without the host device.

Example 27 includes the system of Example 26, wherein the means for deriving the simplified authentication data comprises means for determining threshold values corresponding to the sensor data.

Example 28 includes the system of Example 27, wherein the means for deriving simplified authentication data comprises: means for obtaining technical abilities of the child device, and means for determining the threshold values for the sensor data based on the technical abilities of the child device.

Example 29 includes the system of Example 27, further comprising: means for receiving historic sensor data from the child device; means for determining that the threshold values should be modified based on the historic sensor data; means for modifying the simplified authentication data based on the historic sensor data; and means for transmitting the modified simplified authentication data to the child device.

Example 30 includes the system of any of Examples 27-28, wherein the sensor data is obtained from a plurality of sensors of the child device, and wherein the simplified authentication data comprises weighted values for sensor data from each of the plurality of sensors.

Example 31 includes the system of any of Examples 27-28, further comprising: means for receiving an indication from the child device that additional sensor data does not conform to the simplified authentication data; and means for disabling the child device.

Example 32 includes the system of Example 31, wherein the means for disabling the child device comprises: means for performing an analysis of the additional sensor data to determine whether the additional sensor data conforms to the authentication profile for the child device, and means for disabling the child device in response to determining that the additional sensor data does not conform to the authentication profile for the child device.

It is to be understood that the above description is intended to be illustrative, and not restrictive. For example, the above-described embodiments may be used in combination with each other. As another example, the above-described flow diagrams include a series of actions which may not be performed in the particular order depicted in the drawings. Rather, the various actions may occur in a different order, or even simultaneously. Many other embodiment will be apparent to those of skill in the art upon reviewing the above description. The scope of the invention should therefore be determined with reference to the appended claims, along with the full scope of equivalents to which such claims are entitled.

What is claimed is:

1. A non-transitory computer readable medium comprising instructions which, when executed, cause at least one host device processor to at least:
   determine a processing resource of a child device operably coupled to the at least one host device processor;
   derive simplified authentication data from sensor data from the child device, the simplified authentication data able to be processed by the processing resource of the child device to authenticate a user of the child device without analysis of the sensor data by the at least one host device processor;
   store the simplified authentication data in an authentication profile for the child device; and
   transmit the simplified authentication data to the child device, wherein the simplified authentication data is to allow the child device to authenticate the user without the at least one host device processor,
   wherein the simplified authentication data stored in the authentication profile for the child device is to be updated by the at least one host device processor based on a change in the sensor data, the updated simplified authentication data to be provided to the child device to authenticate the user.

2. The computer readable medium of claim 1, wherein the instructions, when executed, cause the at least one host device processor to derive the simplified authentication data by determining threshold values corresponding to the sensor data within which the user is to be authenticated.

3. The computer readable medium of claim 2, wherein the instructions, when executed, cause the at least one host device processor to derive simplified authentication data by at least:
   determining the threshold values for the sensor data based on the resource of the child device.

4. The computer readable medium of claim 2, wherein the instructions, when executed, further cause the at least one host device processor to:
   receive historic sensor data from the child device;
   determine that the threshold values are to be modified based on the historic sensor data;
   modify the simplified authentication data based on the historic sensor data; and
   transmit the modified simplified authentication data to the child device.

5. The computer readable medium of claim 1, wherein the sensor data is to be obtained from a plurality of sensors of the child device, and wherein the simplified authentication data includes weighted values for sensor data from each of the plurality of sensors.

6. The computer readable medium of claim 1, wherein the instructions, when executed, further cause the at least one host device processor to:
   receive an indication from the child device that additional sensor data does not conform to the simplified authentication data; and
   disable the child device.

7. The computer readable medium of claim 6, wherein disabling the child device includes:
   performing an analysis of the additional sensor data to determine whether the additional sensor data conforms to the authentication profile for the child device, and
   disabling the child device in response to determining that the additional sensor data does not conform to the authentication profile for the child device.

8. A system for managing authentication of a child device, the system comprising:
   one or more processors; and
   a memory coupled to the one or more processors and including instructions which, when executed by the one or more processors, cause the one or more processors to at least:
      determine a processing resource of a child device;
      derive simplified authentication data from sensor data received from the child device, the simplified authentication data able to be processed by the processing resource of the child device to authenticate a user of the child device without analysis of the sensor data by the one or more processors;
      store the simplified authentication data in an authentication profile for the child device; and
      transmit the simplified authentication data to the child device, wherein the simplified authentication data is to allow the child device to authenticate the user without the one or more processors,
      wherein the simplified authentication data stored in the authentication profile for the child device is to be updated by the one or more processors based on a change in the sensor data, the updated simplified authentication data to be provided to the child device to authenticate the user.

9. The system of claim 8, wherein the instructions, when executed, cause the one or more processors to derive the simplified authentication data by determining threshold values corresponding to the sensor data within which the user is to be authenticated.

10. The system of claim 9, wherein the instructions, when executed, cause the one or more processors to derive simplified authentication data by:
  determining the threshold values for the sensor data based on the resource of the child device.

11. The system of claim 9, wherein the instructions, when executed, further cause the one or more processors to:
  receive historic sensor data from the child device;
  determine that the threshold values are to be modified based on the historic sensor data;
  modify the simplified authentication data based on the historic sensor data; and
  transmit the modified simplified authentication data to the child device.

12. The system of claim 8, wherein the sensor data is to be obtained from a plurality of sensors of the child device, and wherein the simplified authentication data includes weighted values for sensor data from each of the plurality of sensors.

13. The system of claim 8, wherein the instructions, when executed, further cause the one or more processors to:
  receive an indication from the child device that additional sensor data does not conform to the simplified authentication data; and
  disable the child device.

14. A method for managing authentication of a child device by a parent device, comprising:
  determining a processing resource of a child device;
  deriving simplified authentication data from sensor data received from the child device, the simplified authentication data able to be processed by the processing resource of the child device to authenticate a user of the child device without analysis of the sensor data by the parent device;
  storing the simplified authentication data in an authentication profile for the child device; and
  transmitting the simplified authentication data to the child device, wherein the simplified authentication data is to allow the child device to authenticate the user without the parent device,
  wherein the simplified authentication data stored in the authentication profile for the child device is to be updated by the parent device based on a change in the sensor data, the updated simplified authentication data to be provided to the child device to authenticate the user.

15. The method of claim 14, wherein deriving the simplified authentication data includes determining threshold values corresponding to the sensor data within which the user is to be authenticated.

16. The method of claim 15, wherein deriving simplified authentication data includes:
  determining the threshold values for the sensor data based on the resource of the child device.

17. The method of claim 15, further including:
  receiving historic sensor data from the child device;
  determining that the threshold values are to be modified based on the historic sensor data;
  modifying the simplified authentication data based on the historic sensor data; and
  transmitting the modified simplified authentication data to the child device.

18. The method of claim 14, wherein the sensor data is obtained from a plurality of sensors of the child device, and wherein the simplified authentication data includes weighted values for sensor data from each of the plurality of sensors.

19. The method of claim 14, further including:
  receiving an indication from the child device that additional sensor data does not conform to the simplified authentication data;
  performing an analysis of the additional sensor data to determine whether the additional sensor data conforms to the authentication profile for the child device, and
  disabling the child device in response to determining that the additional sensor data does not conform to the authentication profile for the child device.

20. A non-transitory computer readable medium comprising instructions which, when executed, cause at least one local device processor of a local device to at least:
  obtain sensor data from one or more sensors;
  transmit the sensor data to a host device for authentication analysis;
  receive, from the host device, simplified authentication data based on the sensor data and a processing resource of the local device, the simplified authentication data able to be processed by the processing resource of the local device to authenticate a user of the local device without analysis of the sensor data by the host device; and
  authenticate the local device based on the simplified authentication data,
  wherein the simplified authentication data is to be updated by the host device based on a change in the sensor data, the updated simplified authentication data to be provided to the local device to authenticate the user.

21. The computer readable medium of claim 20, wherein the instructions, when executed, further cause the at least one local device processor to:
  determining that current sensor data does not conform to the simplified authentication data; and
  in response to determining that the current sensor data does not conform to the simplified authentication data, disabling the local device.

22. The computer readable medium of claim 20, wherein the instructions, when executed, further cause the at least one local device processor to:
  transmit the current sensor data to the host device for further analysis; and
  authenticate the user based on the further analysis.

23. The computer readable medium of claim 20, wherein the simplified authentication data includes threshold values corresponding to the sensor data.

24. The computer readable medium of claim 20, wherein the simplified authentication data includes weighted values for sensor data from each of the plurality of sensors.

25. The computer readable medium of claim 20, wherein the instructions, when executed, further cause the at least one local device processor to:
  transmit additional sensor data to the host device for further analysis, and
  receive updated simplified authentication data based on the additional sensor data.

26. The computer readable medium of claim 1, wherein the child device includes an Internet of Things device, and wherein the simplified authentication data includes at least one of an image, a movement, or a sound.

* * * * *